United States Patent [19]

Spinazzi

[11] 4,338,218
[45] Jul. 6, 1982

[54] DEVICE FOR ELIMINATION OF FOAM

[75] Inventor: Angelo Spinazzi, Landriano, Italy

[73] Assignee: Rollwash Italiana S.p.A., Milan, Italy

[21] Appl. No.: 970,770

[22] Filed: Dec. 18, 1978

[30] Foreign Application Priority Data

Dec. 19, 1977 [IT] Italy .................. 42913 A/77

[51] Int. Cl.³ .................................................. B01D 19/00
[52] U.S. Cl. ........................................ 252/361; 55/178
[58] Field of Search ............... 252/360, 361; 202/264;
55/87, 178; 422/133, 135, 138, 188

[56] References Cited

U.S. PATENT DOCUMENTS

| 2,395,079 | 2/1946 | Sparks et al. | 422/135 |
| 2,412,342 | 12/1946 | Kallasky | 55/178 |
| 3,148,948 | 9/1964 | Lutz | 252/361 X |
| 3,427,252 | 2/1969 | Gaughan et al. | 252/361 |
| 4,003,724 | 1/1977 | Payne et al. | 55/87 |

FOREIGN PATENT DOCUMENTS 2051526 5/1971 Fed. Rep. of Germany ...... 252/361

Primary Examiner—Michael S. Marcus
Attorney, Agent, or Firm—Guido Modiano; Albert Josif

[57] ABSTRACT

Device for elimination of foam which forms on the surface of a liquid discharged from a vibrating finishing machine in which said liquid is a component part of the finishing solid particles containing medium. The device comprises a plurality of compartments arranged in cascading succession and in each compartment at least one nozzle arranged above the liquid level, pipe means for conducting water under pressure to the nozzle, the nozzle having means for atomizing the liquid sprayed therefrom and directing the atomized spray onto the liquid level and means for adjusting the vertical distance of the nozzle from the liquid level.

3 Claims, 1 Drawing Figure

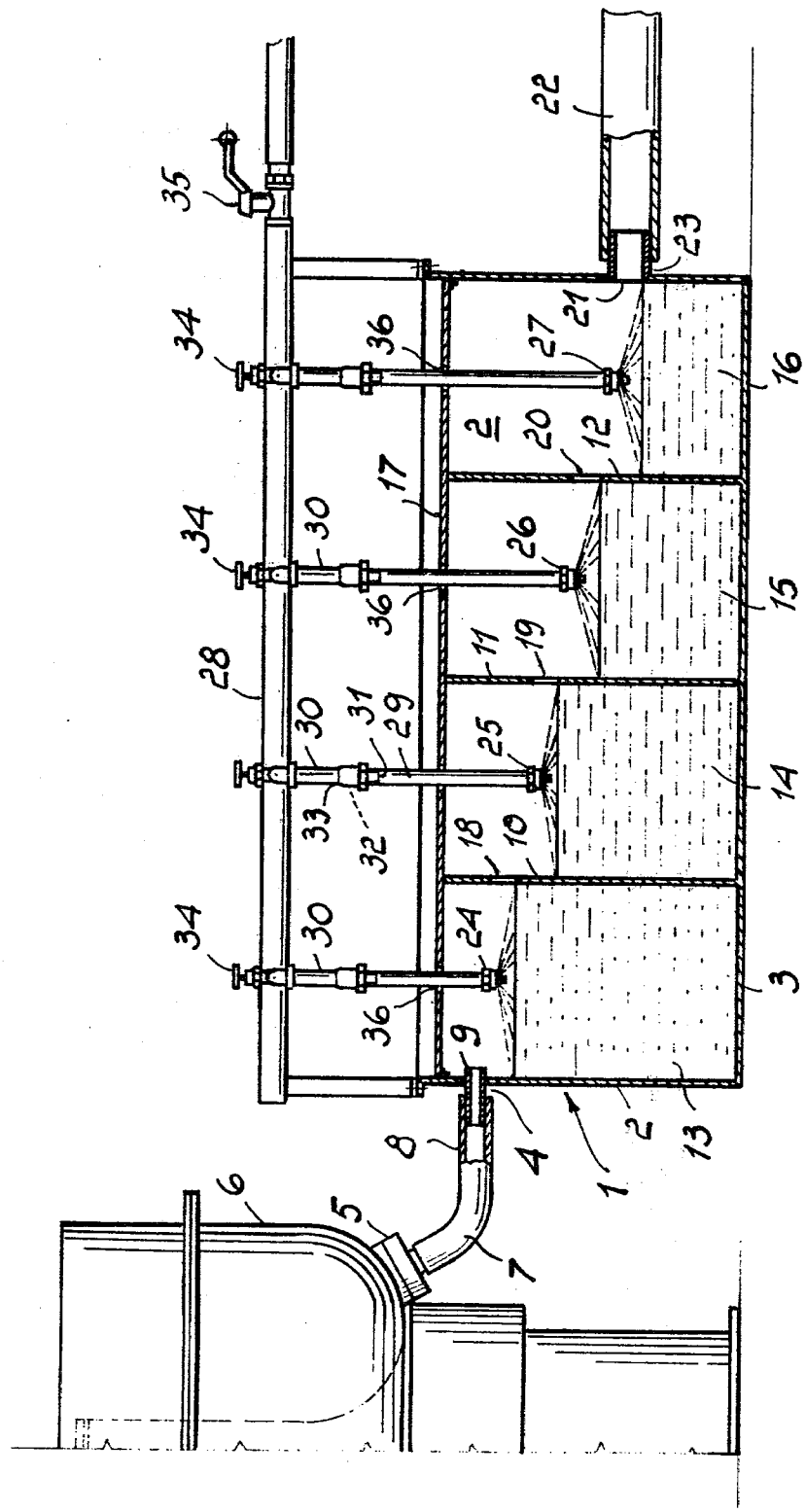

DEVICE FOR ELIMINATION OF FOAM

BACKGROUND OF THE INVENTION

This invention relates to a device for elimination of foam which forms on the surface of a liquid discharged from a vibrating finishing machine in which said liquid is a component part of the finishing solid particles containing medium.

The vibrating finishing machines with which this invention is concerned are of the kind described e.g. in the U.S. Pat. No. Re. 27,084 or German Pat. No. 1 288 947.

It has been common practice to use in the machines of this kind in addition to metallic pieces as finishing medium a mixture of solid granules made either of ceramic or plastic material such as polyesters in which abrasive material such as quartz is contained. Such granules are advantageously immersed in water which works both as cooling and washing medium and prevents formation of powder clouds, in addition to other working functions thereof. After termination of the required working cycles and after separation of the work pieces and the solid finishing granules from water, such water which contains abraded swarf forming particles is discharged as waste. Such swarf containing water has the tendency to form a highly resistant foam on the surface of the liquid. In order to prevent environment pollution it was necessary to eliminate such foam before discharging such water into the sewage system. Heretofore such foam elimination was carried out with cumbersome expensive equipments which did not give economically satisfactory results.

SUMMARY OF THE INVENTION

An object of the invention is to solve the foam elimination problem and to provide a non expensive but efficient device of continuous operation for rapid elimination of foam formed on a liquid discharged from vibrating finishing machines of the above described kind, which will occupy a relatively reduced space and which may be constructed as a working unit easily adaptable to existing working and quantitative conditions.

The above problem is solved by a device for elimination of foam which forms on the surface of a liquid discharged, e.g. from a vibrating finishing machine in which said liquid is a component part of the finishing solid particles containing medium, characterized in that said device comprises a tank, with a bottom wall and side walls and having an inlet in communication with a discharge of the finishing machine and, in a position remote from said inlet, an outlet opening into a discharge pipe, at least one compartment within said tank arranged between said inlet and said outlet, overflow means for defining a maximum liquid level in said compartment and at least one nozzle arranged above said maximum liquid level, pipe means for conducting water under pressure to said nozzle, said nozzle having means for atomizing the liquid sprayed therefrom and directing the atomized spray onto said liquid level and means for adjusting the vertical distance of said nozzle from said liquid level.

It has been found that the adjustment means for adjusting the vertical distance of the nozzle from the liquid level are of great importance since a critical nature of this vertical distance resulted from the experiments carried out, as will be described later.

In addition the cascading flow of the liquid through the device and the successive atomized spray action have given surprisingly advantageous results in foam elimination.

BRIEF DESCRIPTION OF THE DRAWING

The invention will now be more fully described with regard to an embodiment thereof shown in the enclosed drawing in which the only FIGURE is a side elevational view.

DESCRIPTION OF THE PREFERRED EMBODIMENT

With reference to the drawing the shown embodiment comprises a tank 1 having sidewalls 2 and a bottom wall 3. The inlet 4 of the tank 1 is hydraulically connected to the discharge 5 of the finishing vibrating machine 6 through a preferably flexible pipe 7 and connector fittings 8 and 9. Vertical partition walls 10, 11 and 12 divide the tank 1 into four compartments 13, 14, 15 and 16. On top of the tank a lid 17 preferably of transparent plastic material is provided. Each partition wall is provided with an overflow passage 18, 19 and 20 respectively. Each consecutive overflow passage is arranged at a level lower than the preceding one in the direction from the inlet towards the outlet side of the tank 1. The overflow passages 18, 19 and 20 define the maximum liquid level of each respective compartments 13, 14 and 15, while the maximum liquid level in the compartment 16 is defined by the outlet opening 21, which is connected to the sewage system through the pipe 22 and connector fitting 23. Slightly above the level defined by each overflow passage 18, 19, 20 and the outlet 21 of the respective compartments there is provided one respective nozzle 24, 25, 26, 27. The nozzles are connected to a manifold 28 connected to a source of water under pressure not shown. Advantageously such source of water may be an usual faucet of the municipal water supply system the pressure of which may be considered satisfactory. The connection between the nozzles and the manifold is carried out by means of two telescoping pipes 29 and 30 for each nozzle, in order to adjust the vertical distance of each nozzle from the liquid level defined by the overflow passages. The pipes 29 extend through apertures 36 provided in the lid 17. In the shown embodiment the telescoping arrangement between the pipes 29 and 30 is obtained by providing the pipe 30 with a threaded end portion not shown with which one internally threaded end of a nipple joint member 33 engages in screwed relationship therewith. The opposite internally screwed end of the nipple member 33 engages with a threaded portion 31 of the pipe 29, of which a smooth end portion 32 is telescopically inserted into the pipe 30. The smooth end portion 32 has an outer diameter corresponding to the inner diameter of the pipe 30 and projects beyond the threaded portion 31, allowing e telescoping relationship with the pipe 30. Annular gaskets or O-ring type seals, not shown are provided between the telescoping portions of the pipes 29 and 30. It will be appreciated that by simply rotating the nipple member 33 the pipe 29 is axially shifted with respect to the pipe 30 thereby the vertical distance of the nozzle may be adjusted. This is due to the well known opposite thread principle of the nipple joint. Since the adjustment is of the order of few centimeters, the described adjusting arrangement may be satisfactory. Other adjustment constructions may be used without departing from the scope of the invention. The water flow through each pipe 30 is controlled by a respective valve 34, a main valve 35 being provided in the manifold 28 at the end thereof connected to the water supply. Discharge openings, not shown, are provided at the bottom of each compartment for discharging periodically the solid residues accumulating therein.

The nozzles 24 to 27 may be of any suitable type adapted to atomize the liquid spray egressing therefrom. One example of a suitable nozzle is shown in the pubblished German Patent Application No. 2 633 126.

The device operates as follows.

The acqueous liquid coming from the finishing machine 6 fills up the compartments 13 to 16, while simultaneously atomized water sprays from nozzles 24 to 27 are caused to impinge against the liquid surface of each container. It will be appreciated that owing to the selected positions of the overflows 18 to 21 the liquid levels in the subsequent compartments are consecutively lower as compared to the preceding levels and there is a cascading flow of the liquid from one compartment to the other. It has been found that when the vertical distance of the nozzle orifice from the liquid level is within a selected optimum range almost complete foam elimination is obtained and at the exit of the tank 1 the discharged liquid has no tendency to regenerate foam on its surface.

It has been found that within a relatively wide range of water pressure and temperature conditions the optimum vertical distance between the nozzle orifice and the liquid surface is between about 4 and about 8 cm. Good results have been obtained when the angle of divergency of the atomized spray is such that it impinges against a circular area of the liquid surface having a diameter of about 30 to 40 cm. Since other factors may influence the optimum value of the said vertical distance of the nozzle orifice such as the water hardness or composition, the precise setting or adjustment of the vertical distance of the nozzle is carried out during operation of the device. It has been observed with great surprise that during such precise adjustment of the vertical distance the foam elimination abruptly increases when the optimum vertical distance is attained.

The adjustment is carried out by simply rotating the nipple member 33 in one or the other direction until the surprising foam elimination effect is obtained. It was not possible yet to explain scientifically this surprising phenomenon, but one of the decisive teaching of this invention should be envisaged in the indicated adjustment possibility during operation. It has been observed that the prevailing percentage of foam is eliminated in the first compartment 13, while the foam elimination in the subsequent compartments is mainly directed to additionally eliminate the possibility that the thus treated liquid regenerates foam on its surface after the discharge of this apparatus. It is believed that the cascading introduction of the liquid to be treated in the respective compartment combined with the atomized spray action increases the foam elimination and prevents subsequent foam regeneration owing to the fact that the agitation caused by the cascading flow of liquid tending to regenerate foam is immediately counter acted by the atomized spray action thereon. It has been also noted that the lid 17 confines the atomized spray action in the desired direction towards the liquid surface and thereby contributes to the foam elimination action, while at the same time allowing excess pressure withiin the compartments to be vented through the gap exisiting between the pipe 29 and the contour of the opening 36 provided in the lid. The transparency of the lid 17 serves for observing the foam elimination especially during fine or precise adjustment of the vertical distance of the nozzles from the liquid level. Since the liquid to be treated contains abraded metallic particles which are susceptible to rapid oxidation, it is believed that the above described surprising phenomena may also be influenced by the acceleration of metal oxidation due to the atomized spray and the synergetic foam elimination action caused by the forming metallic oxides.

I claim:

1. A device for elimination of foam which forms on the surface of a liquid comprising, a tank with a bottom wall and side walls and having an inlet for the liquid and, in a position remote from said inlet, an outlet opening into a discharge pipe, a plurality of spaced partition walls arranged between said inlet and said outlet to provide a succession of compartments, overflow passages in each of said compartments arranged at consecutively decreasing levels to provide a cascading flow of said liquid from said inlet towards said outlet, atomized spray generating nozzle means above each said compartments, adjusting means for adjusting the vertical distance of said nozzle means from the overflow levels of each compartment, means for supplying water under pressure connected to and communicating with each of the nozzle means.

2. A device for elimination of foam which forms on the surface of a liquid comprising, a tank with a bottom wall and side walls and having an inlet for the liquid and, in a position remote from said inlet, an outlet opening into a discharge pipe, a plurality of spaced partition walls arranged between said inlet and said outlet to provide a succession of compartments, overflow passages in each of said compartments arranged at consecutively decreasing levels to provide a cascading flow of said liquid from said inlet towards said outlet, said inlet being arranged above the overflow level of the compartment into which said inlet opens, said outlet being arranged to coincide with the overflow of the last of said compartments, atomized spray generating nozzle means above each said compartments, adjusting means for adjusting the vertical distance of said nozzle means from the overflow levels of each compartment, means for supplying water under pressure connected to and communicating with each of the nozzle means, the vertical distance of the nozzle means from the overflow levels of the respective compartments being in the range from 4 to 8 cm, a transparent lid arranged above said compartments and having openings for the passage therethrough of said nozzle means.

3. A device according to claim 2, wherein the area over which the atomized spray of water impinges against the liquid level is that of a circle of a diameter of from about 30 to about 40 cm.

* * * * *